United States Patent [19]

Sugiyama et al.

[11] Patent Number: 5,510,829
[45] Date of Patent: Apr. 23, 1996

[54] VOICE AND VIDEO COMMUNICATION APPARATUS

[75] Inventors: Akira Sugiyama, Kawasaki; Masatoshi Otani, Yokohama, both of Japan

[73] Assignee: Canon Kabushiki Kaisha, Tokyo, Japan

[21] Appl. No.: 319,058

[22] Filed: Sep. 26, 1994

Related U.S. Application Data

[63] Continuation of Ser. No. 668,897, Mar. 13, 1991.

[30] Foreign Application Priority Data

Mar. 15, 1990 [JP] Japan .................................. 2-64888
Apr. 3, 1990 [JP] Japan .................................. 2-89794

[51] Int. Cl.⁶ ..................................................... H04N 7/14
[52] U.S. Cl. ................................. 348/14; 348/16; 379/88
[58] Field of Search ................................ 348/14, 15, 16, 348/17, 18, 19; 379/94, 96, 97, 98, 93, 95, 142

[56] References Cited

U.S. PATENT DOCUMENTS

| | | | |
|---|---|---|---|
| 3,917,904 | 11/1975 | Macrander . | |
| 3,933,233 | 1/1976 | Randmere et al. . | |
| 4,538,176 | 8/1985 | Nakajima et al. . | |
| 4,560,833 | 12/1985 | Weber et al. | 358/85 |
| 4,682,349 | 7/1987 | Sorriaux | 379/53 |
| 4,932,047 | 6/1990 | Emmons et al. | 379/53 |
| 4,943,994 | 7/1990 | Ohtsuka et al. | 358/85 |
| 5,204,895 | 4/1993 | Yoshiura | 379/94 |

FOREIGN PATENT DOCUMENTS

| | | | |
|---|---|---|---|
| 0355838 | 2/1990 | European Pat. Off. . | |
| 0436345 | 7/1991 | European Pat. Off. | 379/53 |
| 0129747 | 6/1988 | Japan | 358/85 |
| 0174155 | 7/1989 | Japan | 379/53 |
| 0212056 | 8/1989 | Japan | 379/53 |
| 0311744 | 12/1989 | Japan | 379/53 |
| 0113761 | 4/1990 | Japan | 379/53 |
| 0158250 | 6/1990 | Japan | 379/53 |
| 0006162 | 1/1991 | Japan | 379/53 |

*Primary Examiner*—Curtis Kuntz
*Assistant Examiner*—Stella L. Woo
*Attorney, Agent, or Firm*—Fitzpatrick, Cella, Harper & Scinto

[57] ABSTRACT

A communication apparatus comprising a voice data communication apparatus for communicating voice data, a video data communication apparatus for communicating video data, a determination unit for determining whether the attribute of communication data to be notified at the reception call is voice data or voice and video data, and an informing unit for giving information for a reception call by discriminating between the reception call of voice data and that of voice and video data, based on a determination result of said determination unit.

10 Claims, 11 Drawing Sheets

FIG. 7

| PARTNER'S NUMBER | PARTNER'S TERMINAL ABILITY | OPERATOR'S TERMINAL ABILITY TO BE RETURNED |
|---|---|---|
| A | AV, ANIMATION MAX 108.8Kbps<br>VOICE A-lawPCM, μ-lawPCM, SB-ADPCM | AV ALL FUNCTIONS |
| B | AV, ANIMATION MAX 62.4Kbps<br>VOICE PCM | AV, VOICE PCM |
| C | TELEPHONE MODE | TELEPHONE MODE |
| D | AV, ----- | AV, ----- |
| ----- | | |
| OTHERS (DEFAULT) | | RECEPTION TIME: AV, VOICE PCM(A, μ)<br>TRANSMISSION TIME: SELECTION ACCORDING TO MODE<br>1) AV ALL FUNCTIONS<br>2) AV, VOICE PCM(A, μ)<br>3) TELEPHONE MODE |

FIG. 11A

PARTNER'S ABILITY: VOICE: A-law, μ-law PCM
                          7KHzSB-APPCM
                          16Kbps ANIMATION: Max ~108.8Kbps
                            CIF, QCIF CAPABLE TUD: ALSO CAPABLE FOR LSD, HSD etc. ---

SW SELECTION ? (Y/N)

FIG. 11B

VOICE :     | A-law |    | μ-law |

| SB-ADPCM |    | 16Kbps |

ANIMATION : | 46.4Kbps |    | 62.4Kbps |

108.8Kbps

TUD : -------

SELECTION OK ? (Y/N)

VOICE AND VIDEO COMMUNICATION APPARATUS

This application is a continuation of application Ser. No. 07/668,897 filed Mar. 13, 1991.

BACKGROUND OF THE INVENTION

1. Field of the Invention

The present invention relates to a voice and video communication apparatus capable of communicating the voice information, and the video information such as animation or still image.

2. Related Background Art

Conventionally, there was provided a telephone capable of discriminating, for example, between reception calls from the extension and those from the outside line, by changing the timbre or intermission intervals of reception sound for the telephone.

On the other hand, there was a disadvantage that when a TV telephone set capable of communicating both voice and video informations was connected to the telephone line and used together with a telephone set, it was difficult to discriminate between reception calls from the TV telephone and those from the telephone.

By the way, in ISDN, when the call is received, the communication attributes (transmission ability information factor, lower layer matching information factor, higher layer matching information factor) are notified in an equipment at the reception side. However, an operator at the reception side was not informed of whether the reception call was intended for voice alone or voice with image, for example, based on those communication attributes.

Thus in a communication apparatus capable of communicating the voice and video, there was conventionally a problem that as an operator was not informed of the discrimination between a reception call from telephone and that from TV telephone, an operator's indiscrete appearance might be transmitted to a partner with the TV telephone, if the operator responds to the reception call in the telephone mode irrespective of the TV telephone.

Recently, as the communication service with the ISDN line has been put to practical use, the AV (Audio Visual) service such as a TV telephone or a TV conference system which uses such digital lines comes to public notice, and the service rules for AV service, the protocol rules, and the multimedia multiplication frame structure regulations are publicized as, for example, the CCITT (International Telegraph and Telephone Consultative Committee) recommendation drafts H.320, H.242, H.221 and the like. The draft H.221 defines the coding allocation of BAS (Bit Allocation Signal) which is used for the frame structure and terminal ability exchange, the terminal mode switching, or the bit allocation indication in the AV service on a channel from 64 Kbps to 1,920 Kbps. The draft H.242 defines the protocol procedure between AV terminals, and the draft H.320 defines the system aspect of the entire AV service. The recommendation drafts in association with AGC (Audio Graphic Conference) are also examined successively.

The above drafts define a procedure for selecting a mutual communication with the highest ability between terminals, with the procedure such as a terminal ability exchange sequence with BAS between in-channels or a mode switching sequence, after the establishment of physical connection and synchronization for end-to-end.

Thus, since a conventional terminal responds automatically to a reception call accepted, in accordance with the terminal ability, the video communication ability of an operator's terminal is notified in a partner's terminal undesirable for the mutual communication of video if it is provided. Thereby, there was a disadvantage that a video was automatically transmitted also to a partner's terminal which did not desire to communicate with the video.

In this way, in a conventional TV telephone set capable of communicating the voice and video, the protection of privacy of a terminal user was a consideration.

SUMMARY OF THE INVENTION

An object of the present invention is to resolve the above-described disadvantages on the conventional technology.

Another object of the present invention is to improve a voice and video communication apparatus.

Another object of the present invention is to provide a voice and video communication apparatus capable of protecting the privacy of a terminal user.

Another object of the present invention is to provide a voice and video communication apparatus capable of preventing the transmission of imprudent video data.

Another object of the present invention is to provide a voice and video communication apparatus capable of automatically setting the transmission or non-transmission of video information, depending on a partner for transmission.

A further object of the present invention is to provide a voice and video communication apparatus capable of informing an operator of a reception call while indicating clearly whether the reception call is from the TV telephone or the telephone.

Another object of the present invention is to provide a communication apparatus capable of informing an operator of a reception call from the TV telephone or the telephone with only an image, thereby preventing a reception sound from disturbing a conference in progress.

Another object of the present invention is to provide a communication apparatus capable of preventing the transmission of a careless image and protecting the privacy of an operator, because the transmission of only voice can be selected to respond by inhibiting the transmission of video after the reception call of the TV telephone is recognized.

Another object of the present invention is to provide a communication apparatus capable of protecting the privacy of an operator by inhibiting the AV transmission with video to every partner's terminal, because the ability of an operator's terminal to be notified in a partner's terminal can be changed depending on a transmission partner.

Another object of the present invention is to provide a communication apparatus capable of enhancing the operability of a terminal, for example, at the time when it is desired to disable temporarily the transmission with video to all the partner's terminals, because an operator can easily make the temporary change of an operator's terminal ability to be notified in a partner's terminal.

Another object of the present invention is to provide a communication apparatus capable of protecting the privacy of a user even when communicating with an unregistered terminal, because a predetermined operator's terminal ability is notified in the unregistered partner's terminal.

A further object of the present invention is to provide a communication apparatus capable of rapidly copying with the change of a partner's terminal ability, and making the efficient connection to a partner's terminal that has once been communicated, in the optimal mode on the subsequent communications, because the information of a registered partner's terminal is updated to be newest or the information of an unregistered partner's terminal is added, during communication.

Another object of the present invention is to provide a communication apparatus capable of protecting the privacy of a user by preventing the AV communicability of an operator's terminal from being notified in a partner's terminal unnecessarily, because a voice communication mode is first performed in receiving, and then a communication mode other than the voice communication mode is enabled as desired by an operator, after the confirmation of a communication partner and a partner terminal ability.

The above objects and other objects of the present invention will become clear from the following detailed description in conjunction with the drawings.

BRIEF DESCRIPTION OF THE DRAWINGS

FIG. 7 is a view showing an ability management table classified by partner's number;

FIGS. 11A and 11B are views showing image plane examples of a control information output unit.

DETAILED DESCRIPTION OF THE PREFERRED EMBODIMENTS

An example of the present invention will be described with reference to the drawings.

Figure 1:
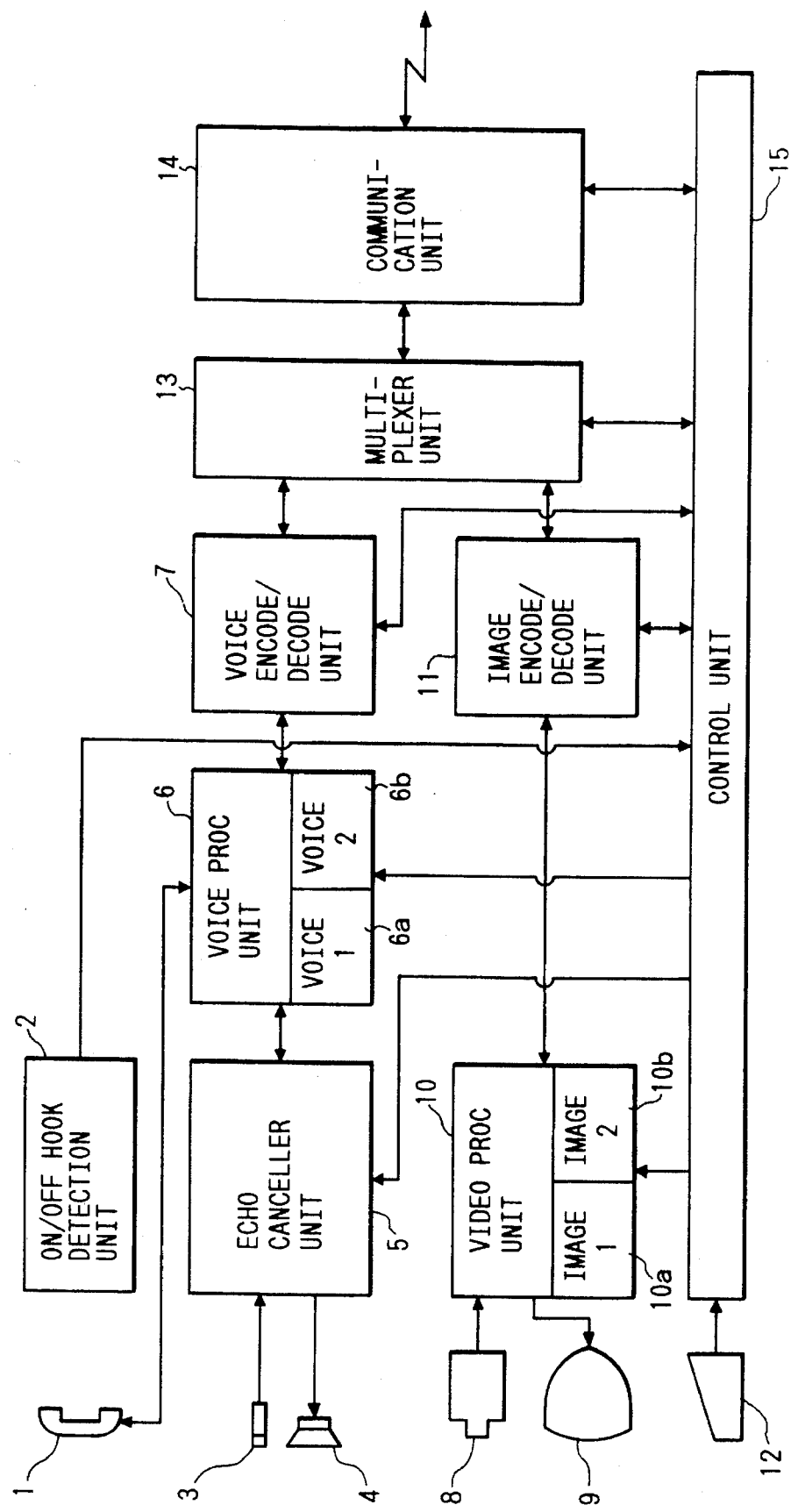
FIG. 1 is a block diagram of a TV telephone set according to a first example of the present invention.

FIG. 1 is an overall block diagram of a TV telephone set according to a first example of the present invention, wherein 1 is a handset which is one of the voice input means of the present apparatus, 2 is an ON/OFF hook detection unit for detecting whether the handset 1 is placed in the on hook or off hook state, 3 is a microphone which is one of the voice input means of the present invention, 4 is a speaker which is one of the voice output means of the present apparatus for outputting a tone such as a dial tone, a ring back tone, a busy tone, or a reception sound according to the present invention, 5 is an echo canceller unit which is connected to the microphone 3 and the speaker 4 for cancelling an echo generated when both are concurrently used, 6 is a voice processor unit which is connected to the handset 1 and the echo canceller unit 5 for switching the handset 1, the microphone 3 and the speaker 4 and generating a tone to be output to the speaker 4 such as a dial toner, a ring back tone, a busy tone, and a reception tone, 7 is a voice encode/decode unit connected to the voice processing unit 6, for encoding a transmission voice signal and decoding a reception voice signal in accordance with a voice signal encode and decode algorithm such as 64kPCM A-low, 64kPCM μ-low, 64kSB-ADPCM, 32kADPCM, or 16kAPC-AB, 8 is a TV camera for inputting an image, 9 is a display for displaying an operator's image input from the TV camera 8, a partner's image received, a reception call notice screen or an operation screen according to the present invention, a communication state, or messages, 10 is a video processing unit connected to the TV camera 8 and the display 9 for performing the signal synthesis to display the operator's image and the partner's image onto a screen being segmented, 11 is an image encode/decode unit connected to the video processing unit 10 for encoding a transmission image and decoding a reception image according to CCITT recommendation H.261, 12 is an operation unit such as keyboard or touch panel, 13 is a multiplexer unit connected to the voice encode/decode unit 7 and the image encode/decode unit 11 for multiplexing and demultiplexing voice data, image data and other data in accordance with CCITT recommendation H.221, 14 is a communication unit connected to the multiplexer unit 13 for controlling the line in accordance with the ISDN user and network interface, and 15 is a control unit connected to each unit 2, 5, 6, 7, 10, 11, 12, 13 and 14 for supervising each unit and controlling the entire apparatus.

Figure 2:
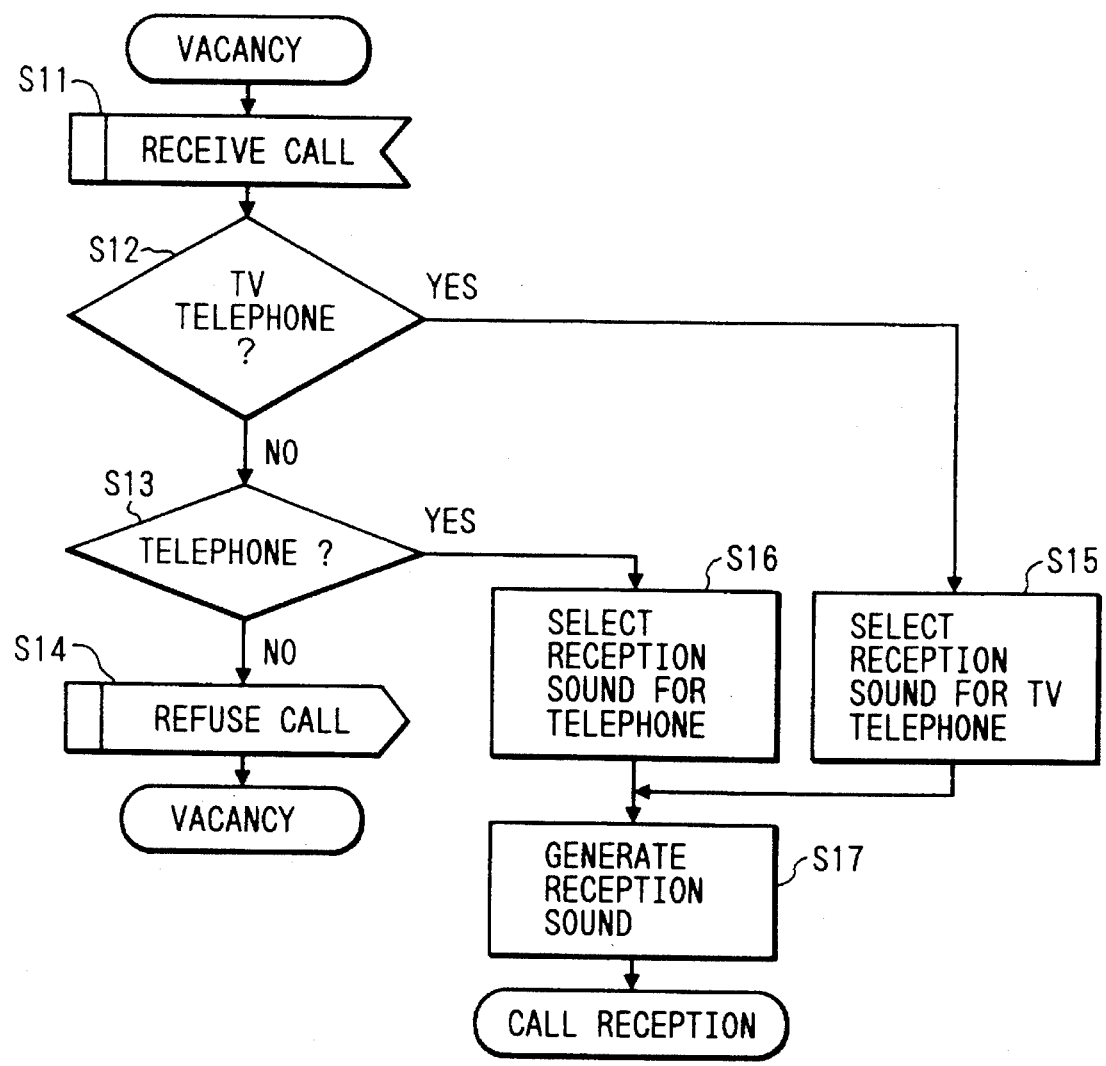
FIG. 2 is a flowchart of the informing procedure of a reception call executed in a control section 15 of FIG. 1.

An informing procedure of a reception call to an operator on the reception side, which is performed in the control unit 15 of a TV telephone set with an above constitution, will be described with reference to a flowchart of control program as shown in FIG. 2.

First, at step S11, the control unit 15 monitors a reception call at vacancy time, and if the communication unit 14 receives a reception call primitive, the processing proceeds to steps S12 and S13. At steps S12 and S13, whether the reception call is from a TV telephone (step S12) or a telephone (step S13) is judged by investigating information factors such as a transmission ability indicated in the reception call primitive received, a lower layer matching or a higher layer matching property. As the result, if the reception call is from the TV telephone, the processing proceeds to step S15, while if it is from the telephone, the processing proceeds to step S16, or otherwise the processing proceeds to step S14 where the reception call is rejected because of unmatching of the reception call, and the program terminates.

At step S15, the control unit 15 selects a first reception sound 6a for informing the operator of the reception call for TV telephone. At step S16, the control unit 15 selects a second reception sound 6b for informing the operator of the reception call for telephone. The above-mentioned first and second reception sounds are different in timbres and intermission intervals. After execution of steps S15 or S16, the processing proceeds to step S17, where the control unit 15 instructs the voice processing unit 6 to generate the reception sound selected at step S15 or S16, and designates the speaker 4 as an output device. The voice processing unit 6 generates the reception sound which was selected and instructed, and output it to the speaker 4. The control unit 15 is placed in a call reception state after execution of step S17 to wait for a response from the operator.

In the above example, the operator can discriminate between a reception call from TV telephone and that from telephone, by virtue of the difference between the reception sounds, but may be informed of a voice message prestored in the voice processing unit 6, for example, "Reception call from TV telephone" or "Reception call from telephone" to identify them. Here the input of this voice can be performed with the handset 1 or microphone 3.

As described above, it is possible to make the operator clearly recognize that a reception call is from the TV telephone or the telephone, by detecting the matching of the reception call and outputting either of the reception sounds informing the reception call of TV telephone and that of telephone in accordance with a detection result obtained.

Figure 3:
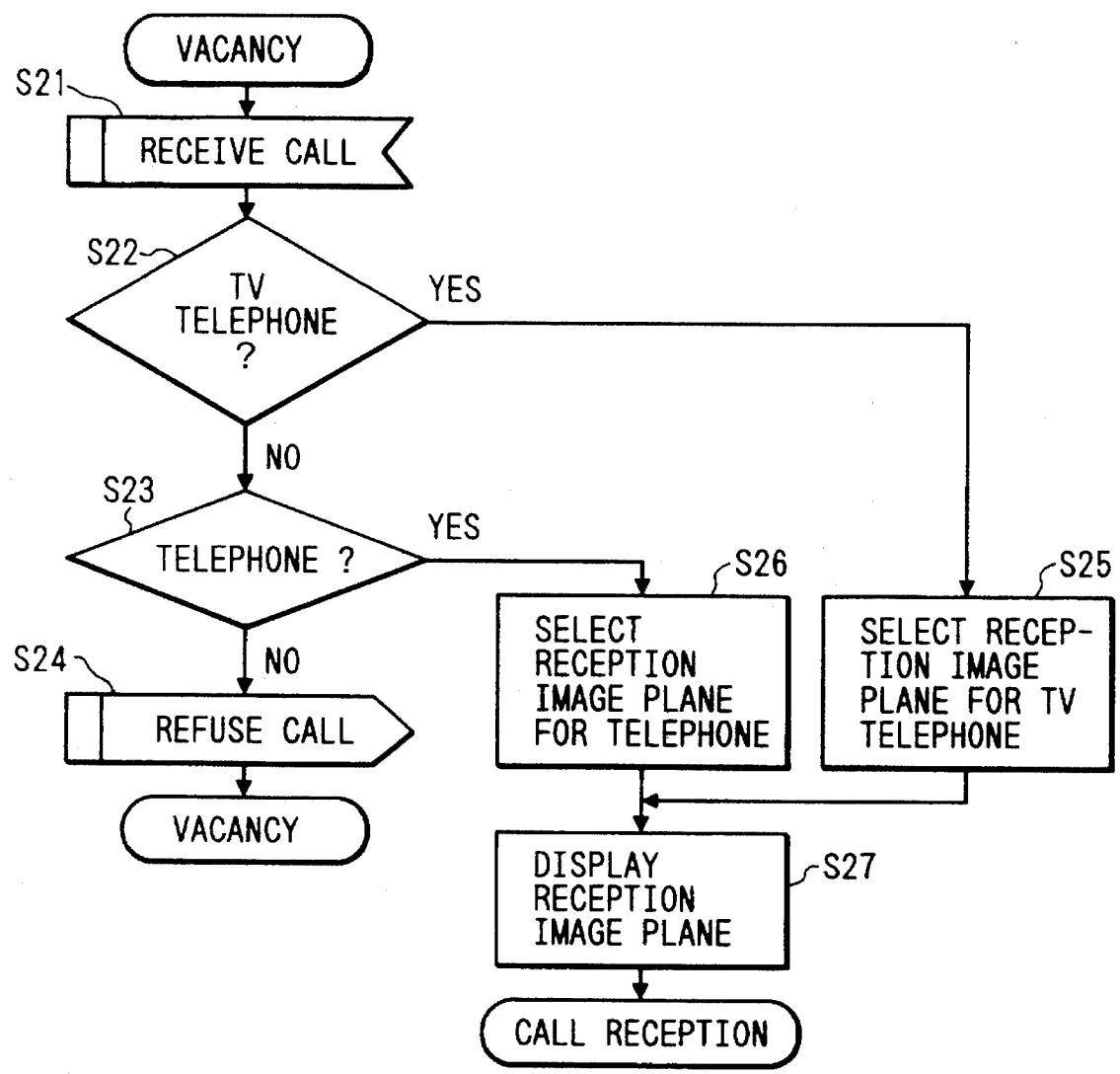
FIGS. 3, 4 and 5 are flowcharts showing another example of the informing procedure of a reception call.

Next, another example of the informing procedure of a reception call as shown in FIG. 2 will be described with reference to a control program flowchart as shown in FIG. 3. Note that steps S21 to S24 in the figure correspond to steps S11 to S14 as shown in FIG. 2, respectively, and as the content of execution for each step are the same as that for corresponding step, the explanation thereof will be omitted.

At step S25, a first reception call notice screen 10a for notifying the operator of a reception call of TV telephone which has been prestored is selected. At step S26, a second reception call notice screen 10b for notifying the operator of a reception call of telephone is selected. After execution of steps S25 or S26, the procesing proceeds to step S27, where the control unit 15 instructs the video processing unit 10 to display the reception call notice screen selected at step S25 to S26. The video processing unit 10 converts an instructed image plane into video signals and outputs them to the display 9. After execution of step S27, the control unit 15 is placed in a call reception state to wait for a response from the operator. Note that the first reception call notice screen 10a and the second reception call notice screen 10b are images input from the TV camera 8 or preset therein.

In the above example, the operator is notified of the discrimination between a reception call from TV telephone and that from telephone, by virtue of the content of image plane, but may be also notified of the discrimination with, for example, the difference of blinkings or colors with a lamp provided.

Further, selection means may be provided for selecting one of the methods as described in the example for indicating the reception call, i.e., method of changing the reception sound and that of changing the image plane, in which the operator can select either method of indicating the reception call, or concurrently implement both indications of changing the reception sound and image plane.

Figure 4:
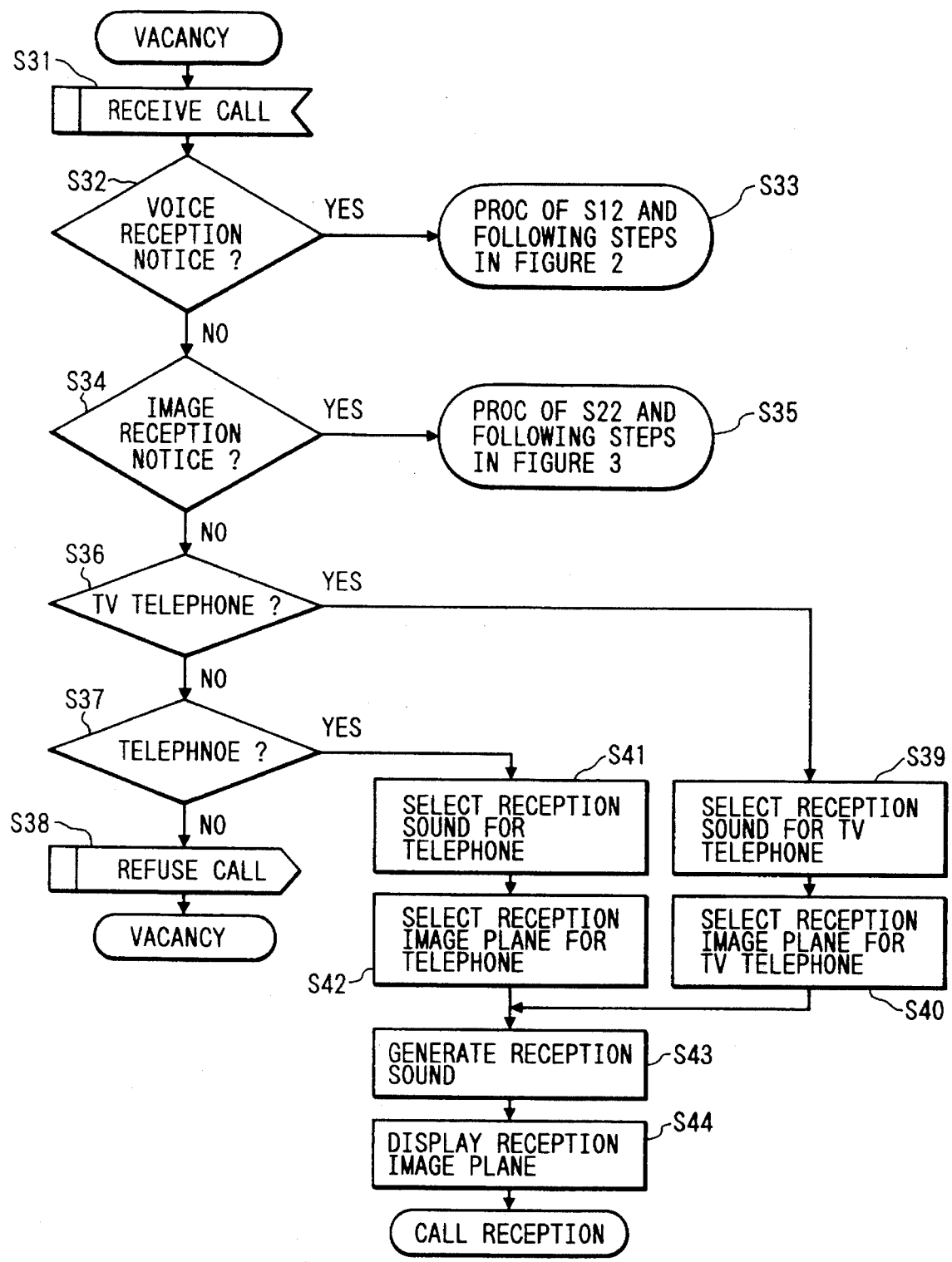

A control flowchart in this case is shown in FIG. 4.

At step S31, if a reception call is accepted, the processing proceeds to step S32. At steps S32 and S33, the operator determines which reception notice is selected among three forms of voice, image, or both voice and image. When the voice reception notice is selected, the processing proceeds from step S32 to step S33, where the processing of S12 and ensuing steps in FIG. 2 are performed. When the image reception notice is selected, the processing proceeds from step S34 to step S35, where the processings of S22 and ensuing steps in FIG. 3 are performed.

When the voice and image reception notice is selected, the processing proceeds from step S34 to step S36. At steps S36 and S37, a partner's ability received is judged, wherein if the reception call is judged from TV telephone, the processing proceeds to step S39, while if it is judged from telephone, the processing proceeds to step S41, or otherwise, the processing proceeds to step S38. When the reception call is from TV telephone, the reception sound for TV telephone 6a is selected at step S39 and the reception image plane for TV telephone 10a is selected at step S40. When the reception call is from telephone, the reception sound for telephone 6b is selected at step S41 and the reception image plane for telephone 10b is selected at step S42. At step S43, the reception sound selected at step S39 or S41 is generated, and at step S44, the reception image plane selected at step S40 or S41 is displayed.

Next, an example in which the transmisson of video information to a partner can be inhibited after a reception call from TV telephone is informed and responded to will be described with reference to FIG. 5. The following explanation is based on an example of changing the reception sound depending on whether the reception is from telephone or TV telephone, but can be also applied to a case where the reception image plane is changed with both reception sound and reception image.

Figure 5:
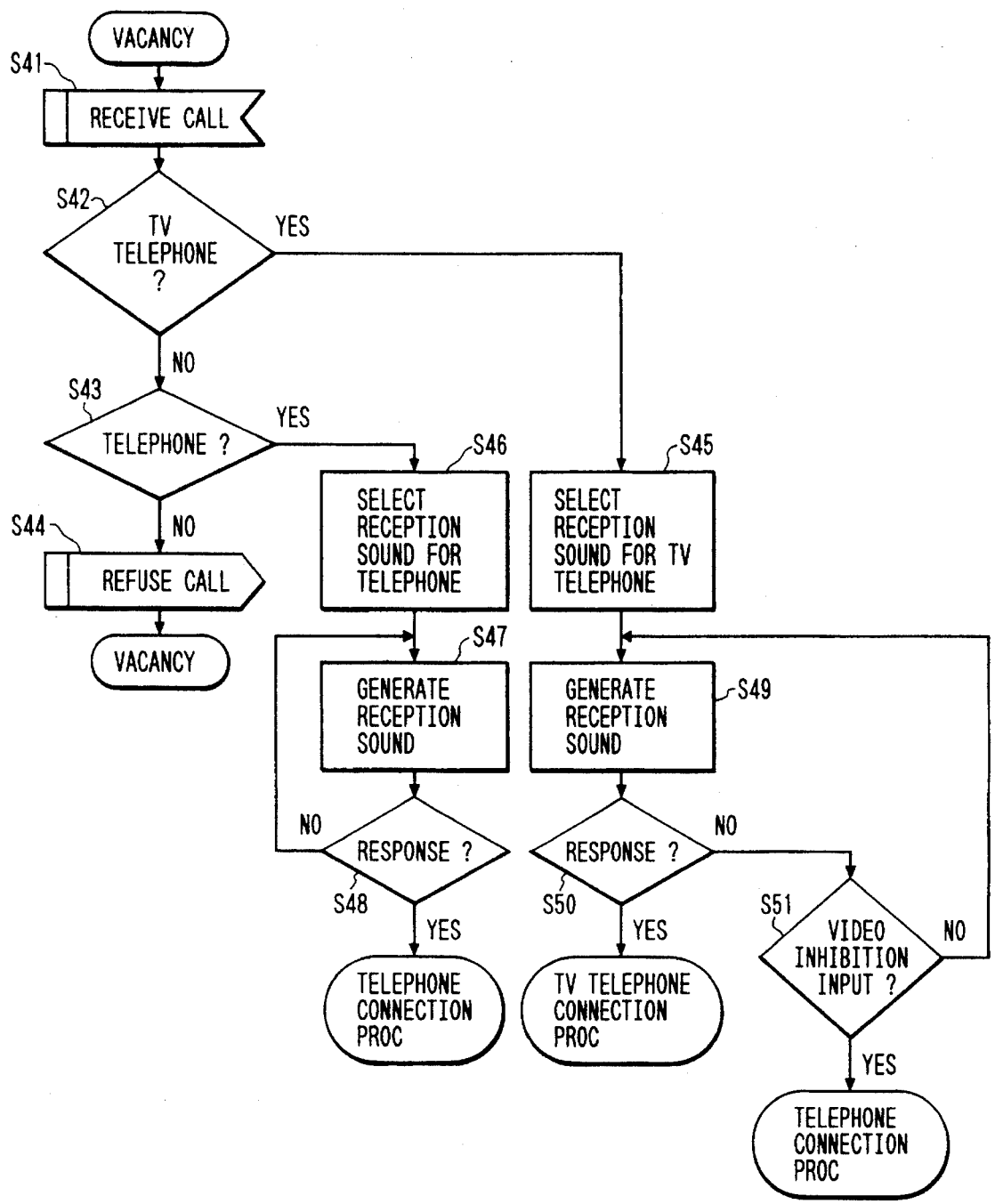

In FIG. 5, the processings at steps S41 to S46 correspond to steps S11 to S26 in FIG. 2.

When the reception from telephone is made, at step S47, the reception sound for telephone which was selected at step S46 is generated. Thereafter, if the response is entered with an off-hook of handset by the operator, the processing proceeds from step S48 to the telephone connection processing, thereby enabling the transmission with voice.

When the reception from TV telephone occurs at step S49, the reception sound for TV telephone which was selected at step S45 is generated. Afterwards, if the response is entered with an off-hook of handset by the operator, the processing proceeds from step S50 to the TV telephone connection processing, thereby enabling the transmission with voice and video. On the other hand, if an input for inhibiting the transmission of video is performed by the operator after the reception sound is generated at step S49, the processing proceeds from step S51 to the telephone connection processing. In this case, no video information is transmitted to a partner's equipment, and the transmission with only voice is enabled.

As described above, it is possible to inform the operator of a reception call while indicating clearly whether the reception call is from TV telephone or telephone, by detecting the matching of the reception call, and outputting either of the reception sounds or image planes informing the reception call of TV telephone and that of telephone in accordance with a detection result obtained.

Further, it is possible to make the operator recognize a reception call whether it is from TV telephone or telephone by giving the reception call with only an image, so that even when the reception sound may disturb a conference in progress, for example, the conference is not obstructed.

Further, according to the present invention, the transmission of an imprudent image can be prevented and the privacy of an operator can be protected because the transmission of only voice can be selected to respond by inhibiting the transmission of video after a reception call from TV telephone is recognized.

Next, a second example in which the transmission or non-transmission of video can be automatically set depending on a communication partner will be described.

Figure 6:
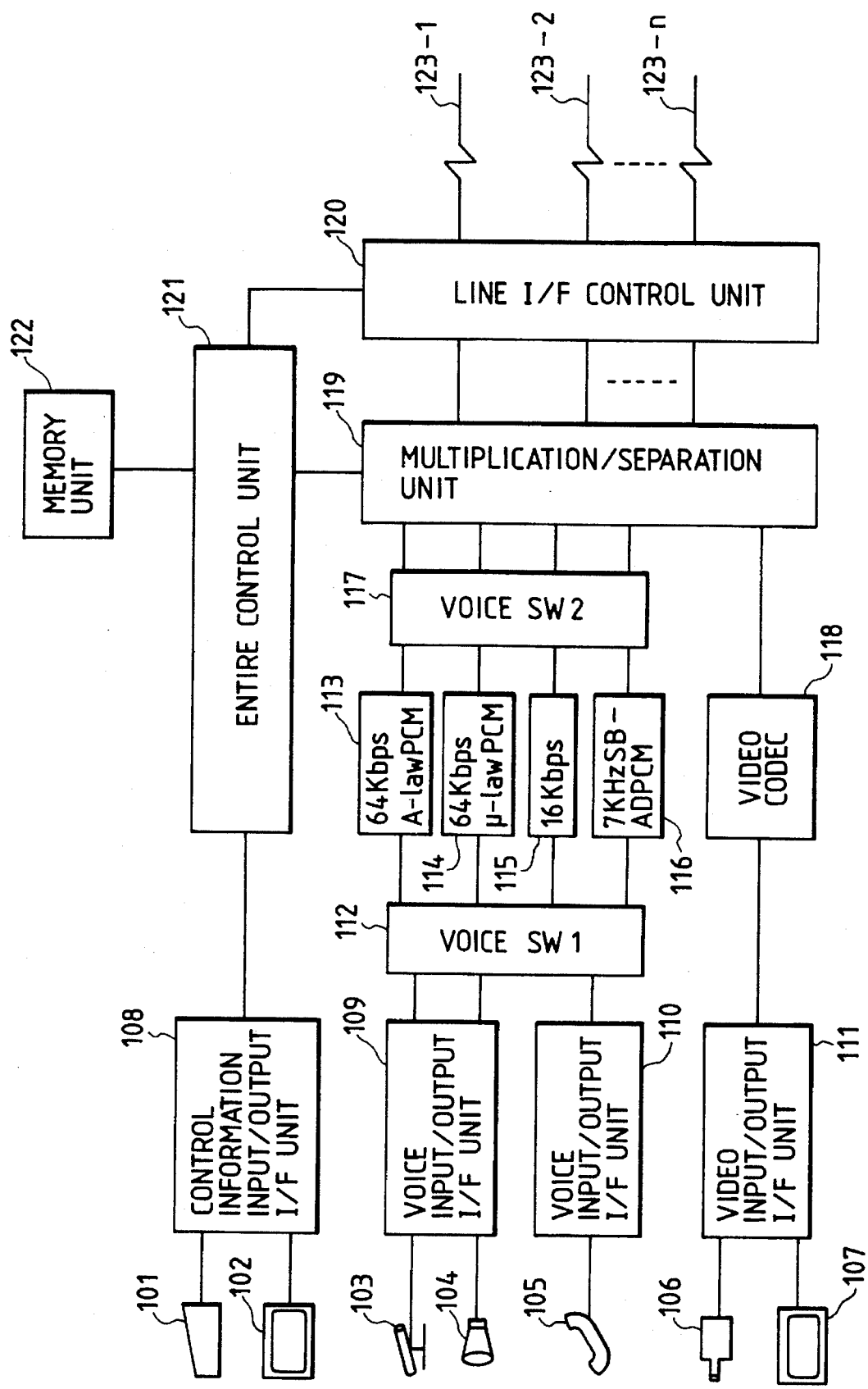
FIG. 6 is a block diagram of a TV telephone set according to a second example of the present invention.

FIG. 6 is a block diagram showing the configuration of a TV telephone set according to the second example of the present invention. In the same figure, 101 is a control information input unit (for example, a keyboard or a ten key) used for the input of control information to perform the overall control of the present apparatus, wherein it is connected via a control information input/output interface unit 108 for controlling the input/output of control information to an entire control unit 121. The control information input/ output interface unit 108 is connected with a control information output unit 102 such as a monitor for displaying the control information.

A voice input unit 103 such as a microphone and a voice output unit 104 such as a speaker are connected via a first voice input/output interface unit 109 for controlling the input/output of voice signals to a first voice switch 112, which is connected via a second voice input/output interface unit 110 to a voice input/output unit 105 such as a handset. The first voice switch 112 is connected to a 64 kbps A-law PCM voice codec (encoder/decoder unit) 113, a 64 kbps μ-law PCM voice codec 114, a 16 kbps voice codec 115, and 7 KHz voice associated SB-ADPCM voice codec 116, with these voice codecs 113 to 116 being connected via a second voice switch 117 to a multiplication/separation unit 119. The voice codecs 113 to 116 are to encode and decode in accordance with the respective encode/decode rules, in which the present apparatus can cope with four rules. The first and second voice switches 112, 117 can select any one of these codecs.

On the other hand, a video input unit 106 such as a camera and a video output unit 107 such as a monitor are connected via a video input/output interface unit 111 for controlling the input/output of video signals to a video codec 118, which is connected to the multiplication/separation unit 119. The video codec 118 encodes and decodes the video information in accordance with a predetermined rule.

The multiplication/separation unit 119 is connected via the entire control unit 121 and a line control interface control unit 120 to the lines 123-1, 123-2 ..., 123-n, to multiplex various media in a unit of transmission information frame and separate received information frame into various media in a unit of constitution. The line interface control unit 120 is connected to the entire control unit 121, which controls the connection between the present apparatus and the line. The entire control unit 121 is connected with a memory unit 122, which stores various control information of the whole apparatus, and an information table for partner's terminal ability per partner's number and operator's terminal ability to be exchanged with partner's terminal. The entire control unit 121 controls the whole apparatus in accordance with the control information from the control unit 101 and the memory unit 122.

FIG. 7 is a table showing the partner's terminal number (partner's number) stored as an ability management table classified by partner's number in the memory unit 122, the partner's terminal ability and the operator's terminal ability to be returned in the ability exchange with partner's terminal. In the same figure, a partner's terminal with the number A, for example, is capable of the AV communication, which indicates that video animation is communicable at a transmission rate of 108.8 kbps at maximum, with the voice ability of dealing with the modes of A-law PCM, μ-law PCM and SB-ADPCM, and the operator's terminal ability to be notified in the partner's terminal is all functions. A partner's terminal with the number B is communicable at a transmission rate of 62.4 kbps at maximum in video, and in voice, communicable in the PCM mode, while indicating that only the voice PCM should be returned from the present apparatus as an operator's terminal ability. This means that the transmission of video is not desired for the partner with the number B.

Further, when the reception is made from a partner's terminal with a number which is not registered in the management table (thereafter called as "unregistered terminal"), only the voice PCM is notified as the operator's terminal ability, and in transmitting to the unregistered terminal, one of the all functions, the voice PCM (A-law, μ-law) or the telephone mode with which the partner's terminal can cope is notified as the operator's terminal ability.

Figure 8:
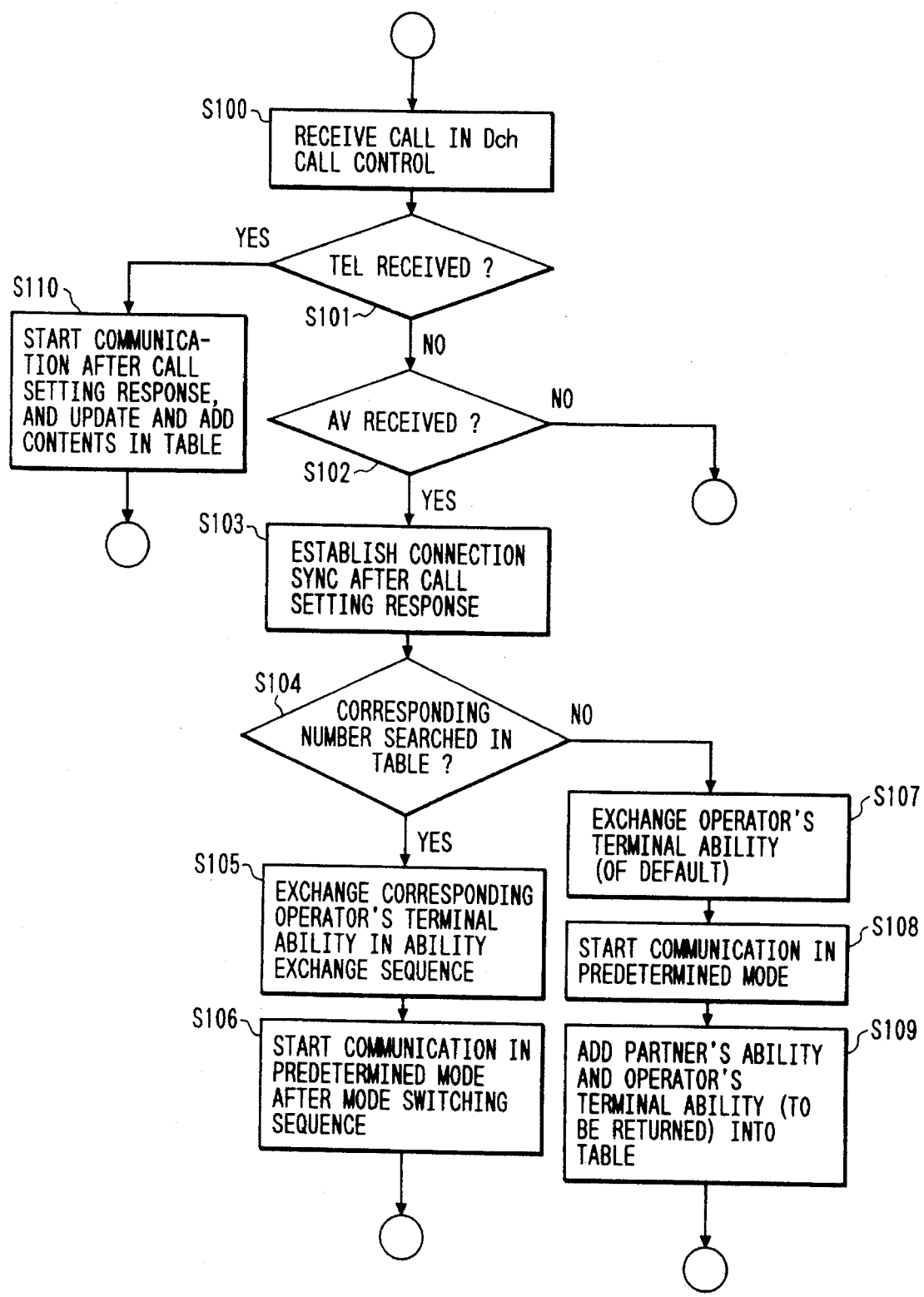
FIG. 8 is a flowchart showing the operation at reception time in the TV telephone set of FIG. 6.

FIG. 8 is a flowchart showing the operation at reception time in the present apparatus.

First, at step S100, a Set up message is received as a reception call in the Dch call control. At step S101, whether or not the current reception call is a telephone call is determined with the parameters of BC (Bearer Capability) and HLC (High Layer Compatibility) in this Set up message. If it is a telephone call (the answer at step S101 is yes), the processing proceeds to step S110, where the communication is started by returning a call setting accept response, and when received from a partner unregistered in the aforementioned ability management table classified by partner's number, data associated with the partner's terminal are registered and the contents of table are updated. If it is not a reception call of telephone (the answer at step S101 is no), the processing proceeds to step S102, where whether or not the reception is in the AV communication mode is determined. There are currently some cases where this determination can not be made in this phase, and in such cases, the determination is made in the in-channel procedure after the establishment of call setting accept response connection at step S103. If it is not the AV communication (the answer at step S102 is no), there is a possibility of enabling the reception within a range supported by the terminal, thus transferring to another processing. If it is the AV communication mode (the answer at step S103 is yes), the synchronization of connection is established after the establishment of call setting accept response connection at step S103. At step S104, the corresponding number is searched in the management table as shown in FIG. 7, to determine whether or not the partner is registered. If the corresponding partner's number is registered (the answer at step S104 is yes), an operator's terminal ability indication corresponding to the partner is picked up with reference to the operator's terminal ability to be returned (notified) in the management table, and the ability is returned in the ability exchange sequence (step S105). Further, the management table of FIG. 7 is updated as required by referring to a partner's terminal ability to be transmitted from the partner, or the new information is added to the management table. Next, after the execution of the mode switching sequence at step S106, the mutual communication is started in a predetermined mode. For example, for a reception call in the AV communication mode from a partner with the number B as shown in the management table, the PCM voice is only notified in the partner as the operator's ability as the communication mode with animation is not desired, with the result that the mutual communication mode with the PCM voice alone is selected. If the corresponding partner's number does not exist at step S104 (the answer is no at step S104), the processing proceeds to step S107, where the operator's terminal ability to be returned which is registered in the management table as the default is exchanged, and the communication in a predetermined mode is started at step S108. In this case, the present example enables the mode only with the PCM voice. At step S109, the partner's ability which is transmitted from the partner is added to the management table as a new data, while at the same time registering the operator's ability to be returned as the communication mode with the partner.

Note that though in the above example, the operator's terminal ability to be returned to the partner is switched completely based on the management table of FIG. 7, it is also possible to set temporarily by the input with a control key or the like such that the PCM voice mode only is returned to every partner. In this case, a management table for use with temporary change is stored in the memory unit 122, apart from the management table as shown in FIG. 7, and the management table for use is changed in accordance with an instruction of user.

Figure 9:
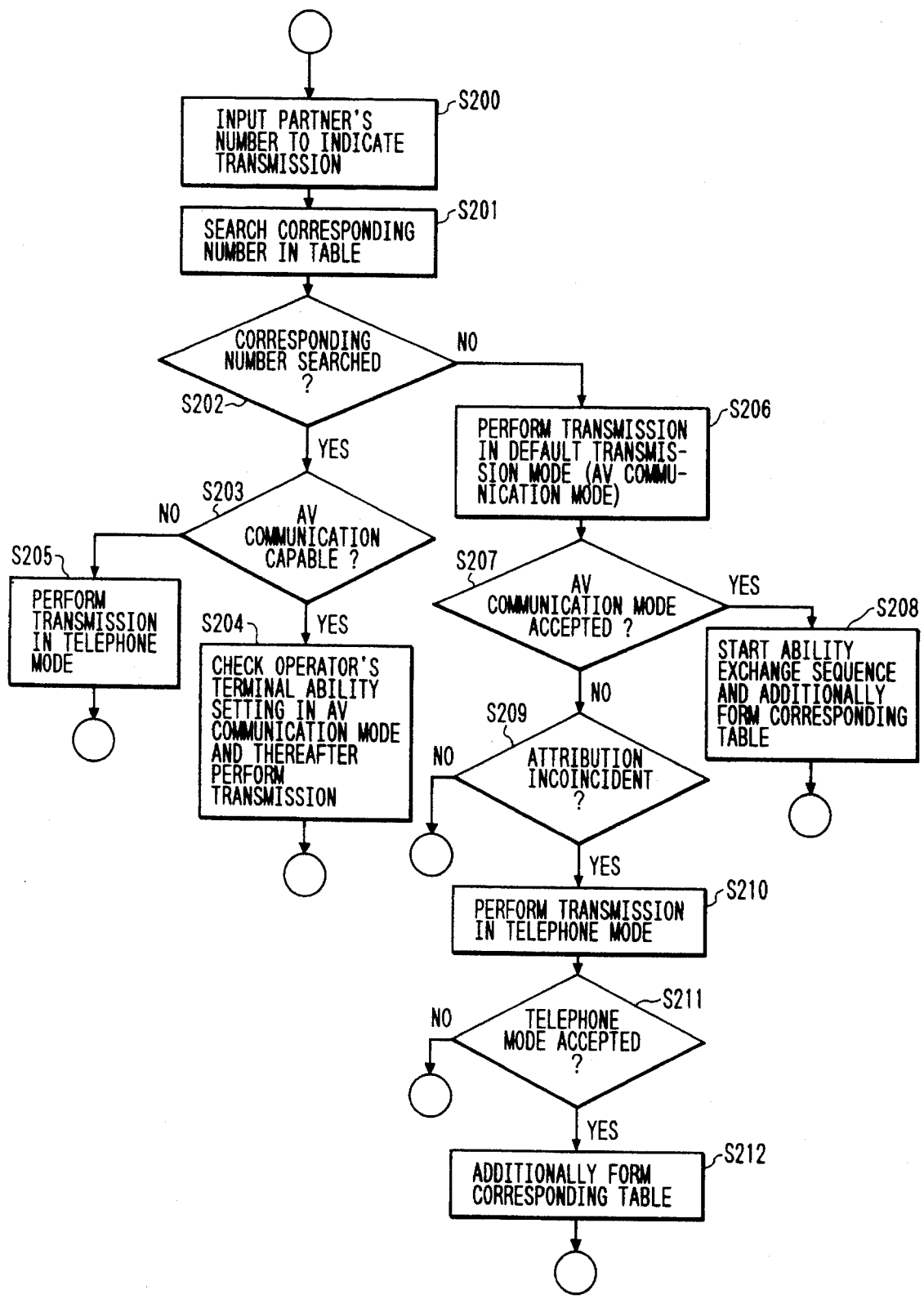
FIG. 9 is a flowchart showing the operation at transmission time in the TV telephone set of FIG. 6.

Next, the operation of the present apparatus at transmission time will be described in detail with reference to a flowchart as shown in FIG. 9.

First, at step S200, a partner's number is input to indicate the transmission. At step S201, the corresponding number is searched in the management table. At step S202, whether or not the corresponding number is searched is determined (the answer at step S202 is yes), the processing proceeds to step S203. At step S203, whether or not the corresponding partner is capable of the AV communication mode is determined, and if so (the answer at step S203 is yes), the call transmission is made in the AV communication mode at step S204, the operator's terminal ability set in the management table in the AV communication mode is notified in a partner, in which the mutual communication is performed within a predetermined mode. If the partner is not provided with the AV communication mode (the answer at step S203 is no), the call transmission is made automatically in the telephone mode for the telephone mode communication (step S205). If the corresponding number does not exist at step S202 (the answer at step S202 is no), the processing proceeds to step S206, where the call transmission is performed in the default AV communication mode. At step S207, whether or not the call transmission is accepted in the AV communication mode from the present apparatus is determined, and if accepted (the answer at step S207 is yes), the default ability exchange is performed at step S208 and additionally, the ability which has been transmitted from the partner is added to the management table as a new data. Thereafter, the AV communication mode with respect to the corresponding partner is changed as required, and the operator's terminal ability to be returned is updated.

If the transmission in the AV communication mode is not accepted at step S207 (the answer at step S207 is no), the processing proceeds to step S209, where a determination is made whether or not the reason is owing to "attribution unmatching", i.e., the terminal without the AV communication mode, and if not (the answer at step S209 is no), the reason is displayed and the communication is terminated. If "the attribution is unmatching" (the answer at step S209 is yes), the processing proceeds to step S210, where the call transmission in the telephone mode is automatically made. If it is accepted at step S211 (the answer at step S211 is yes), the processing proceeds to step S212, where the partner's terminal attribution allowing only for the telephone mode is added to the management table as a new data. If it is not accepted (the answer at step S211 is no), the reason is displayed and the communication is terminated.

As above described, in a TV telephone set according to the present example, since the operator's terminal ability to be returned to a partner can be changed based on a partner number or a temporarily set mode when receiving in the AV communication mode, the user's privacy can be protected by preventing the AV communication with video from being made to anyone unnecessarily, and copying with flexibility the case where the video is not desired to transmit temporarily. Further, even when transmitting in any partner's terminal, the efficient connection with the partner's terminal can be accomplished in the optimal mode by referring to the management table, and without any clear instruction by an operator as regards whether or not the partner is capable of the AV communication. This respect is significantly important especially in the period or the system in which a normal telephone and a TV telephone are mixed.

Further, as a predetermined operator's terminal ability is notified when receiving from an unregistered partner's terminal in the management table or transmitting to such an unregistered terminal, the privacy of a user can be protected in communicating to the unregistered partner's terminal.

Further, as the content of the management table for a partner's terminal is updated during communication to the partner's terminal, or new information is added, the change of partner's terminal ability can be rapidly followed, and the efficient connection with a partner that has once communicated is enabled in the optimal mode in the subsequent communications.

Note that though in the above examples, the operator's terminal ability to be returned to a partner is determined basically based on the management table of FIG. 7, on changed based on a temporary instruction, it is also possible to switch the communication mode with respect to the partner during communication temporarily or to update the return ability. Further, the AV communication mode can be determined based on not only the partner's number but also the special information exchanged in the extension mode of BAS in the subaddress or in-channel.

Figure 10:
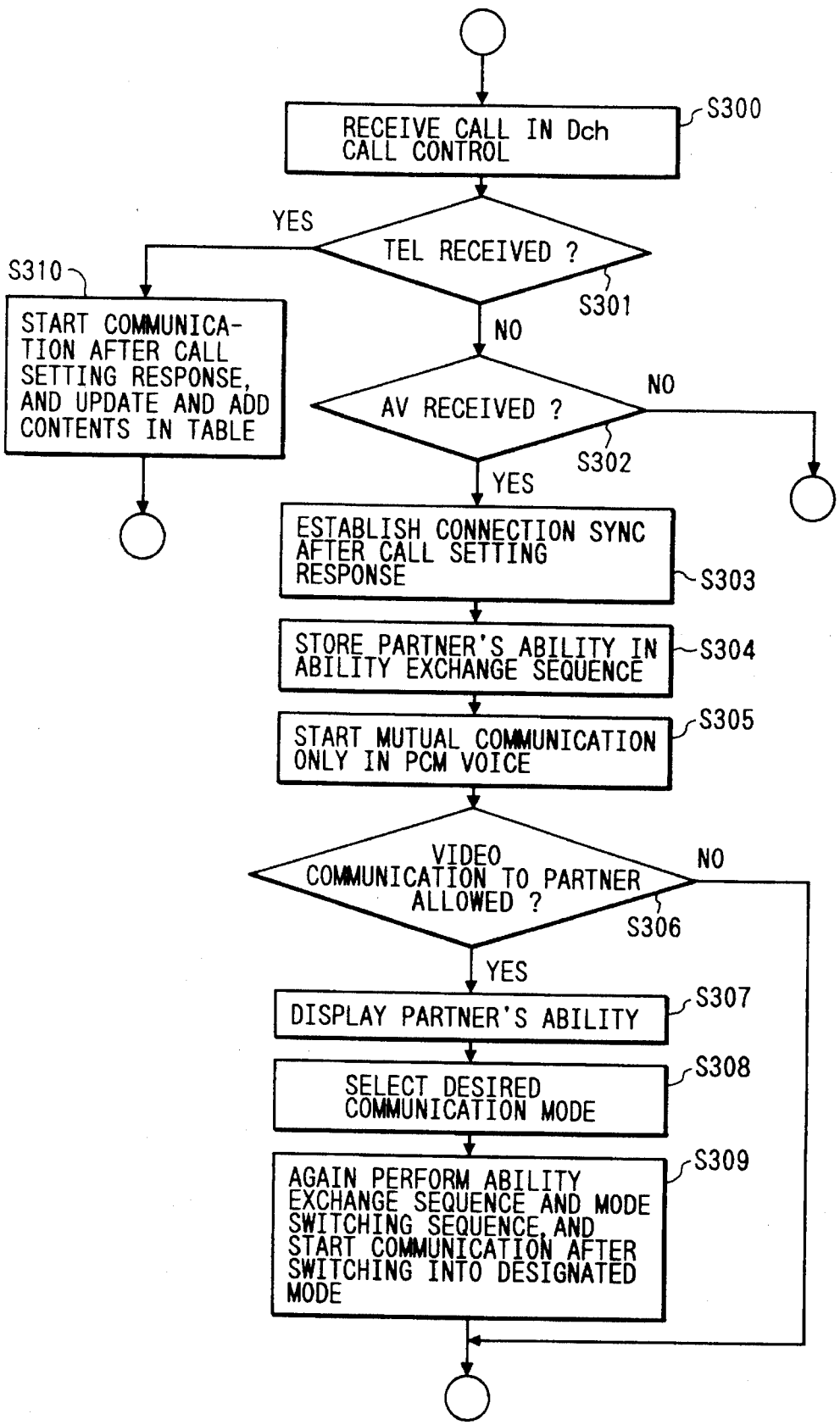
FIG. 10 is a flowchart showing the operation at reception time according to another example.

FIG. 10 is a flowchart showing the operation of another example at reception time.

Steps S300–S303 and S310 are the same as those of steps S100–S103 and S110 as previously shown in FIG. 8.

After the execution of step S 303,i.e., after the synchronization for connection in the AV communication mode has been established, the operator's terminal ability is made capable only of the PCM voice communication, the ability exchange sequence is performed in accordance with the procedure of the CCITT recommendation draft H.242 as previously described, and the partner's terminal ability to be received from the partner's terminal is stored in the memory unit 22 (step S304). At the same time, the content of the management table as shown in FIG. 7 is updated or added as required by referring to the management table. Next, at step S305, the mutual communication only in the PCM voice is started, whereby the partner can be truly known. At step S306, if a user of corresponding terminal determines that the video communiction to the partner is capable or desired to make (the answer at step S306 is yes), the processing proceeds to step S307, where the partner's ability is displayed in the control information output unit 102, for example, as shown in FIG. 11A. Here, the user of the apparatus selects a communication mode by switching into a selection screen as shown in FIG. 11B, for selecting the optimal mode in view of the partner's terminal ability and the operator's terminal ability (or may select on the same screen). Next, at step S309, the ability exchange sequence is again performed in accordance with the procedure of aforementioned H.242, and after switching into a desired communication mode in the mode switching sequence, the mutual communication is performed. If the video communication is not perfomred at step S306 (the answer at step S306 is no), the communication is continued in the current state.

In this way, according to the present example, when receiving from a partner's terminal, the mutual communication only in the PCM voice is first performed, and after the confirmation of a communication partner and the partner's terminal ability, the mutual communication with video is performed only if a user of the apparatus desires the communication with video, thereby preventing the AV communicability of an operator's terminal from being notified in the partner's terminal unnecessarily, and protecting the privacy of user. Particularly, according to the present example, as the communication mode can be selected after a user of the partner's terminal is confirmed with the voice communication, the present apparatus is effective in such a case where a plurality of users are assumed in one partner's terminal, and a part of users are not desired for the communication with video.

Note that though in the above example, the PCM voice communication is necessarily performed once at reception time, and the communication mode is reset after the confirmation of a partner, the AV communication with video can be started with a specific partner unconditionally if there is no designation. Further, the partner's ability may not be displayed every time in switching the communication mode during communication, but the mode switching can be instructed in one touch with a special key or the like so as to be performed promptly in accordance with the communication mode stored in the management table.

As above described, the following effects can be obtained according to the second example of the present invention.

(1) As the ability of an operator's terminal to be notified in a partner's terminal can be changed depending on a communication partner, the AV communication with video to all the partner's terminals can be inhibited and the privacy of an operator can be protected.

(2) As an operator can easily perform the temporary change of operator's terminal ability to be notified in a partner's terminal, the operability of terminal can be enhanced, for example, when it is desired to inhibit temporarily the communication with video to all the partner's terminals.

(3) As a predetermined operator's terminal ability is notified in an unregistered partner's terminal, the privacy of a user can be protected even when communication with unregistered terminal.

(4) As the information of a registered partner's terminal is updated to be newest during communication, or the information of an unregistered partner's terminal is added, the change of the partner's terminal ability can be followed promptly, and the efficient connection to a partner's terminal that has once been communicated can be accomplished in the optimal mode on the subsequent communications.

(5) As the voice communication mode is first performed in receiving, and a communication mode other than the voice communication is enabled in accordance with an operator's desire, after the confirmation of a communication partner and the partner terminal ability, the AV communicability of an operator's terminal is prevented from being notified in a partner's terminal unnecessarily and thus the privacy of a user can be protected. Particularly, the present apparatus is effective, for example, when a plurality of users are assumed in one partner's terminal and a part of users are not desired for the communication with video.

While the present invention has been described in terms of its preferred examples, it should be understood that the present invention is not limited to the above examples, but numerous variations may be made thereto within the scope of the appended claims.

What is claimed is:

1. A communication apparatus comprising:

voice data communication means for communicating voice data;

video data communication means for communicating video data;

memory means for storing a terminal ability to be notified in a partner's terminal for each terminal of of first and second partner's terminals at a communication start time; and notification means for giving notice of the terminal ability stored in said memory means in accordance with a partner's terminal at reception or transmission time, wherein said memory means stores the voice data as the terminal ability to be notified to said first partner's terminal, and said notification means notifies the voice data as the terminal ability when communicating with the first partner's terminal, and notifies the voice and video data as the terminal ability when communicating with said second partner's terminal.

2. A communication apparatus according to claim 1, further comprising control means for controlling said voice data communication means and said video data communication means, based on the terminal ability that is notified by said notification means.

3. A communication apparatus according to claim 1, further comprising change memory means for changing and storing temporarily the content of the operator's terminal ability to be notified in partner's terminal stored in said memory means, and wherein said notification means notifies the partner's terminal of the operator's terminal ability, in accordance with a partner's terminal number and the content of memory in said change memory means, at reception or transmission time, when there is an instruction of said change.

4. A communication apparatus according to claim 1, wherein a memory means stores an operator's terminal ability to be notified when received from a partner's terminal having a terminal number not stored.

5. A communication apparatus according to claim 1, wherein a memory means stores an operator's terminal ability to be notified when transmitting to a partner's terminal having a terminal number not stored.

6. A communication apparatus according to claim 1, further comprising learning means for updating the memory content of a memory means for a partner's terminal, and registering additionally a new information of said partner's terminal to said memory means.

7. A communication apparatus comprising:

voice information communication means for communicating voice data;

video information communication means for communicating video data;

notification means for notifying a partner's terminal of the transmission and reception ability of voice information as a terminal ability at reception time;

display means for displaying communication abilities of plural video information transmitted from the partner's terminal at reception time;

selection means for selecting one communication ability among the communication abilities of the plural video information;

renotification means for renotifying the communication ability of the video information selected by said selection means to the partner terminal, after start of communication in a voice communication mode; and communication mode change means for changing the communication in said voice communication mode to that in the mode according to the communication ability of the video information which is renotified.

8. A communication apparatus comprising:

voice data communication means for communicating voice data;

video data communication means for communicating video data;

memory means for storing a terminal ability to be notified in a partner's terminal for each terminal of a plurality of partner's terminals; and notification means for giving notice of the terminal ability stored in said memory means in accordance with a partner's terminal at reception or transmission time, wherein said memory means stores change data for temporarily changing contents to be notified to the partner's terminal, and said notification means transmits the change data as the terminal ability to the partner's terminal when the notification of the change data is selected.

9. A communication apparatus comprising:

voice data communication means for communicating voice data;

video data communication means for communicating video data;

memory means for storing an operator's terminal ability to be notified in a partner's terminal for each terminal of a plurality of partner's terminals;

notification means for giving notice of the operator's terminal ability stored in said memory means in accordance with a partner's terminal at reception or transmission time; and change memory means for changing and storing temporarily the content of the operator's terminal ability to be notified in partner's terminal stored in said memory means, wherein said notification means notifies the partner's terminal of the operator's terminal ability, in accordance with a number of the partner's terminal and a content of memory in said change memory means, at reception or transmission time, when there is an instruction of said change.

10. A communication apparatus comprising:

voice data communication means for communicating voice data;

video data communication means for communicating video data;

memory means for storing communication modes to be executed for first and second partner's terminals, respectively, each of the first and second partner's terminals being capable of both voice data communication and video data communication;

reception means for receiving information which is transmitted from a partner's terminal and represents that terminal; and control means for controlling said voice data communication means and said video data communication means according to the communication mode which has been stored in said memory means and the information representative of a terminal received by said reception means, wherein said memory means stores only voice data communication as the communication mode to be executed for the first partner's terminal, and stores voice data and video data communication as the communication mode to be executed for the second partner's terminal, and said control means controls said voice data communication means when communicating with the first partner's terminal, and controls said voice data communication means and said video data communication means when communicating with the second partner's terminal.

* * * * *

UNITED STATES PATENT AND TRADEMARK OFFICE
CERTIFICATE OF CORRECTION

PATENT NO. : 5,510,829

DATED : April 23, 1996

INVENTORS : Akira Sugiyama et al.

It is certified that error appears in the above-identified patent and that said Letters Patent is hereby corrected as shown below:

On drawing sheet:
IN THE FIGURES

Sheet 4, Figure 4, "TELEPHNOE?" should read --TELEPHONE?--.

COLUMN 3

Line 65, "toner," should read --tone,--.

COLUMN 6

Line 12, "S26" should read --S16--.

COLUMN 11

Line 31, "communication" should read --communicating--, and
Line 65, "of of" should read --of--.

COLUMN 12

Line 19, "partner's" should read --the partner's--.

UNITED STATES PATENT AND TRADEMARK OFFICE
CERTIFICATE OF CORRECTION

PATENT NO. : 5,510,829

DATED : April 23, 1996

INVENTORS : Akira Sugiyama et al.

It is certified that error appears in the above-identified patent and that said Letters Patent is hereby corrected as shown below:

<u>COLUMN 13</u>

Line 28, "partner's" should read --a partner's--.

Signed and Sealed this

Eighth Day of October, 1996

Attest:

BRUCE LEHMAN

*Attesting Officer*        *Commissioner of Patents and Trademarks*